US006972274B1

(12) United States Patent
Slikta et al.

(10) Patent No.: US 6,972,274 B1
(45) Date of Patent: Dec. 6, 2005

(54) METHOD OF IMPROVING THE PERMEABILITY OF AN UNDERGROUND PETROLEUM-CONTAINING FORMATION

(75) Inventors: Alberto Slikta, Chicago, IL (US); James F. Gadberry, Danbury, CT (US); Andress K. Johnson, Pleasantville, NY (US)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 10/088,962

(22) PCT Filed: Sep. 15, 2000

(86) PCT No.: PCT/US00/25483

§ 371 (c)(1),
(2), (4) Date: Feb. 3, 2003

(87) PCT Pub. No.: WO01/23703

PCT Pub. Date: Apr. 5, 2001

Related U.S. Application Data

(60) Provisional application No. 60/155,593, filed on Sep. 24, 1999.

(51) Int. Cl.$^7$ ............................ E21B 43/22; C09K 3/00
(52) U.S. Cl. ................. 507/240; 507/211; 507/244; 507/246; 507/261; 166/270; 166/270.1; 166/311
(58) Field of Search ................. 507/211, 240, 261, 507/244, 246; 166/305.1, 307, 311, 270, 166/270.1

(56) References Cited

U.S. PATENT DOCUMENTS

| | | | |
|---|---|---|---|
| 3,323,593 A | 6/1967 | Foshee et al. ................. 166/42 |
| 3,625,284 A | 12/1971 | Gogarty et al. ............... 166/273 |
| 3,637,015 A | 1/1972 | Holm .......................... 166/273 |
| 3,637,016 A | 1/1972 | Holm .......................... 166/273 |
| 3,670,819 A | 6/1972 | Dauben et al. ............. 166/305 R |
| 3,677,343 A | 7/1972 | Showalter .................... 166/252 |
| 3,797,574 A * | 3/1974 | Feuerbacher et al. ..... 166/270.1 |
| 3,920,074 A | 11/1975 | Sarem ......................... 166/273 |
| 4,071,457 A * | 1/1978 | Meister ........................ 507/203 |
| 4,120,356 A | 10/1978 | Meister ........................ 166/267 |
| 4,284,435 A | 8/1981 | Fox ............................... 134/2 |
| 4,287,950 A * | 9/1981 | Baker et al. ............... 166/270.1 |
| 4,464,268 A | 8/1984 | Schievelbein ............ 252/8.55 B |
| 4,514,310 A | 4/1985 | Heilweil ................... 252/8.55 R |
| 4,595,511 A | 6/1986 | Seybold et al. .......... 252/8.55 B |
| 4,624,314 A * | 11/1986 | Clark ............................ 166/271 |
| 4,668,408 A | 5/1987 | McClaflin et al. ......... 252/8.552 |
| 4,669,544 A | 6/1987 | Nimerick ...................... 166/300 |
| 4,690,217 A | 9/1987 | Taggart et al. ............... 166/274 |
| 4,775,489 A | 10/1988 | Watkins et al. ........... 252/8.552 |
| 4,979,564 A * | 12/1990 | Kalpakci et al. .......... 166/270.1 |
| 5,104,556 A | 4/1992 | Al-Yazdi .................. 252/8.552 |
| 5,246,072 A | 9/1993 | Frazier, Jr. et al. ......... 166/273 |
| 5,374,361 A | 12/1994 | Chan ........................... 507/211 |
| 5,388,646 A | 2/1995 | Hensley ....................... 166/271 |
| 5,458,197 A | 10/1995 | Chan ........................... 166/304 |
| 5,458,198 A | 10/1995 | Hashemi et al. ............. 166/312 |
| 5,501,276 A | 3/1996 | Weaver et al. ............... 166/291 |
| 5,551,516 A | 9/1996 | Norman et al. .............. 166/308 |
| 5,564,500 A | 10/1996 | Rogers et al. ............... 166/312 |
| 5,595,243 A | 1/1997 | Maki, Jr. et al. ......... 166/177.2 |
| 5,602,083 A | 2/1997 | Gabrysch et al. ........... 507/200 |
| 5,607,905 A | 3/1997 | Dobson, Jr. et al. ........ 507/211 |
| 5,627,144 A | 5/1997 | Urfer et al. .................. 507/211 |
| 5,670,460 A | 9/1997 | Neely et al. ................. 507/203 |
| 5,678,631 A | 10/1997 | Salisbury et al. ............ 166/304 |
| 5,830,831 A | 11/1998 | Chan et al. .................. 507/211 |
| 5,977,032 A | 11/1999 | Chan ........................... 507/211 |
| 6,435,277 B1 * | 8/2002 | Qu et al. ..................... 166/281 |

FOREIGN PATENT DOCUMENTS

| | | | |
|---|---|---|---|
| EP | 0 835 983 | 4/1998 | ........... E21B 43/26 |
| WO | WO 96/34078 | 10/1996 | ............ C11D 1/66 |

* cited by examiner

Primary Examiner—Philip C. Tucker
(74) Attorney, Agent, or Firm—Ralph J. Mancini

(57) ABSTRACT

The present invention generally relates to a method and a composition useful in restoring the permeability of a porous underground petroleum containing formation. Restoring permeability to the formation enhances the injectivity thereby accelerating petroleum recovery. The method of the invention comprises treating said formation with a composition which comprises a combination of at least one non-ionic compound, preferably an alkoxylated alcohol, with at least one cationic compound, preferably a quaternary ammonium compound, in an amount effective to improve the permeability of the formation. The composition may also optionally contain an alkyl glycoside.

16 Claims, No Drawings

METHOD OF IMPROVING THE PERMEABILITY OF AN UNDERGROUND PETROLEUM-CONTAINING FORMATION

This is a 371 of PCT/US00/25483 filed Sep. 15, 2000 which claims benefit of provisional application 60/155,593, filed on Sep. 24, 1999.

FIELD OF THE INVENTION

The present invention generally relates to compositions and methods for improving the injectivity of water injection wells thereby restoring permeability to the formation and enhancing the recovery of oil by the waterflood process.

BACKGROUND OF THE INVENTION

Petroleum is generally recovered from subterranean formations by penetrating the formation and establishing fluid communication with one or more wells and pumping or permitting the petroleum to flow to the surface. This method of recovery called primary recovery ordinarily recovers only 20–30% of the petroleum existing in the formation.

Once primary recovery has ceased, secondary recovery methods such as water flooding techniques are often called for. Secondary recovery is accomplished by penetrating the formation with an injection well and establishing fluid communication. Water or steam is then forced into the injection well and petroleum and water are recovered at the recovery well. Petroleum recovery in water-wells is, however, inherently low. More particularly, in a porous subterranean oil-containing formation, the pores in the area adjacent to the well bore have a tendency to become clogged with synthetic and biological matter which restricts the flow of aqueous fluids such as drive fluids into the injection well in a petroleum recovery process. With time, the accumulation of plugging materials becomes sufficient to substantially reduce the permeability of the formation fact to the drive fluid which greatly impairs petroleum recovery.

Various methods have been suggested for improving the injectivity of water injection wells to be used in certain waterflood processes where there is low formation permeability to water compared to the formation absolute permeability due to the presence of residual oil in the formation pore spaces. For example, U.S. Pat. No. 4,690,217 describes a method for improving the injectivity of water injection wells which comprises the injection of an aqueous fluid containing an effective amount of a surface-active agent into the well. The surfactants employed by this document are anionic.

U.S. Pat. No. 4,464,268 discloses a method for restoring the permeability of injection wells which have been plugged by polymer residue and or organic debris. The method includes treating the well for a period of time with an aqueous solution containing hydrogen peroxide, and acid selected from the group consisting of hydrochloric, hydrofluoric and acetic, and optionally a surfactant.

U.S. Pat. No. 5,374,361 discloses a composition for well bore cleaning which comprises an alkyl polyglucoside and a cosurfactant which is selected from a linear alkyl ethoxylate or an alkyl phenyl ethoxylate, and caustic.

U.S. Pat. No. 5,830,831 discloses a composition for well bore cleanout which consists essentially of a first surfactant which is an alkyl polyglucoside and a second surfactant consisting essentially of at least one alkyl polyglucoside and a linear ethoxylated alcohol.

U.S. Pat. No. 4,514,310 discloses a method for well bore treatment with a composition containing in major part, a nonaqueous solvent containing at least 50% by weight of N-methyl-2-pyrrolidone.

U.S. Pat. No. 4,668,408 discloses a composition for treatment of well bores containing parraffin. The composition comprises a liquid mixture of a water-soluble ethoxylated alkyl phenol and an alcohol containing one to four carbon atoms.

U.S. Pat. No. 5,501,276 discloses a method and composition for removing gelled and dehydrated drilling fluid and filter cake from the walls of well bores. The composition comprises an aqueous solution of a sugar selected from mono-, di-, and triglycerides and mixtures thereof.

Finally, U.S. Pat. No. 5,678,631 discloses a chemical additive for cleaning well bores which comprises an ether amine, alkene alcohol and water.

The object of the present method is to provide an improved and environmentally friendly method of restoring the permeability to injection wells that are plugged by various biological and synthetic organic debris and for improving the overall recovery rate of secondary recovery methods. This and other objects are realized by the method and composition of the present invention.

SUMMARY OF THE INVENTION

The present invention generally relates to a method of restoring the permeability of a porous subterranean petroleum-containing formation thereby improving the improving the injectivity of water injection wells leading to enhanced oil recovery. The method generally comprises treating said formation with a composition which comprises a combination of at least one nonionic surfactant with at least one cationic surfactant in a ratio and in a concentration effective to restore permeability to the formation.

DETAILED DESCRIPTION OF THE INVENTION

The method and composition of the present invention is useful for removing drilling residues, sludge, muds, paraffin, mud solids, biological or synthetic solids and the like from the formation area adjacent to the well bore of an injection well thus restoring permeability to a subterranean formation. The method generally comprises treating the formation with a composition, which comprises a combination of at least one nonionic surfactant with at least one cationic surfactant in a specific ratio such that the permeability of a porous subterranean oil-containing formation is improved thereby enhancing oil recovery. The composition of the present invention is also effective in clearing partially blocked or plugged well bores.

The nonionic surfactant of the present composition is preferably selected from the group consisting of alkanolamides, alkoxylated alcohols, alkoxylated amines, alkyl phenyl polyethoxylates, lecithin, hydroxylated lecithin, fatty acid esters, glycerol esters and their ethoxylates, glycol esters and their ethoxylates, esters of propylene glycol, sorbitan, ethoxylated sorbitan, polyglycosides and the like, and mixtures thereof. Alkoxylated alcohols, preferably ethoxylated alcohols, optionally in combination with (alkyl) polyglycosides are the most preferred nonionic surfactants.

The ethoxylated alcohol useful in the context of the present invention is preferably an ethoxylated linear or branched alcohol having from 8 to 18 carbon atoms reacted with 2 to 12 moles of ethylene oxide. Ethoxylated alcohols of the following general alcohol are particularly preferred:

$$R-O-(CH_2CH_2O)_z-H \quad (I)$$

wherein R is a $C_8$–$C_{30}$ saturated or unsaturated, branched or straight chain alkyl group, or an alkylphenyl group of the formula

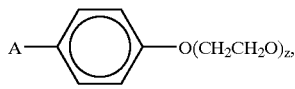

wherein A is a $C_8$–$C_{30}$ saturated or unsaturated, branched or straight chain alkyl, preferably a $C_9$–$C_{12}$ linear or branched alkyl, and z is an integer of from 1 to 30.

The following alcohols are particularly preferred: lauryl alcohol ethoxylated with 3 moles of ethylene oxide(EO), coco alcohol ethoxylated with 3 moles of EO, stearyl alcohol ethoxylated with 5 moles of EO, mixed $C_{12}$–$C_{15}$ alcohol ethoxylated with 7 moles EO, mixed secondary $C_{11}$–$C_{15}$ alcohol ethoxylated with 7 moles EO, mixed $C_9$–$C_{11}$ linear alcohol ethoxylated with 6 moles EO, a $C_9$–$C_{11}$ alcohol ethoxylated with 4 moles EO, and the like. Narrow range, less dispersed ethoxylates are particularly preferred. The nonionic surfactant component of the present invention can be prepared by various methods in the prior art know those skilled in the art. Alternatively, many nonionics useful in the context of the present invention are commercially available.

The preferred (poly) alkyl glucoside nonionic surfactant is represented by formulae III or IV, below:

$$R_4 (CH_2)_y-O-G_xH \quad (III)$$

wherein $R_4$ is a straight or branched chain alkyl or alkenyl group having from 8 to 21 carbon atoms, G is a monosaccharide residue and x and y are selected from a number of from 1 to 5.

$$\underset{\underset{R_5}{|}}{R_4(CHCH_2)_y}-O-G_xH \quad (IV)$$

wherein $R_4$ is a straight or branched chain alkyl or alkenyl group having from 8 to 21 carbon atoms, $R_5$ is hydrogen or a straight or branched chain alkyl or alkenyl group having from 8 to 21 carbon atoms, G is a monosaccharide residue and x and y are selected from a number of from 1 to 5.

The cationic surfactants of the present are preferably selected from primary, secondary and tertiary amines, ester amines, amido amines, quaternary ammonium salts, ester containing quaternary ammonium compounds, amido amine quaternary ammonium compounds, alkyl pyridinium salts, and the like. The most preferred cationic surfactant is a quaternary ammonium compound. A class of quaternary ammonium compounds usefully employed in the context of the present invention is represented by the general formula:

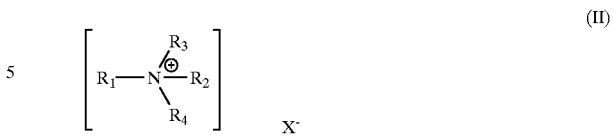

wherein $R_1$ is an saturated or unsaturated, branched or straight chain alkyl group having 8–22 carbon atoms, preferably, cocoalkyl; $R_2$ is a $C_1$ to $C_8$ alkyl group, 2-ethylhexyl, hydroxyethyl, hydroxypropyl, preferably methyl, ethyl or propyl; $R_3$ is selected from $R_1$, $R_2$, or a group of the formula:

$$\underset{\underset{R_5}{|}}{(CH_2CHO)_m}\underset{\underset{R_6}{|}}{(CH_2CHO)_n}H$$

wherein $R_5$ and $R_6$ independently selected from hydrogen or a $C_1$ to $C_6$ alkyl group, and m+n is an integer of from 2–80; $R_4$ is selected from $R_2$ or $R_3$; and $X^-$ is an anion.

Preferred anions include but are not limited to $Cl^{31}$ and methylsulfate ($MeSO_4^-$), acetate and the like.

The cationic surfactant component of the present invention is preferably a bis(ethoxylated) quaternary ammonium compounds including but are not limited to: stearyl methyl bis(ethoxy) ammonium chloride (12 moles EO), stearyl ethyl bis(ethoxy) ammonium ethyl sulfate (15 moles EO), tallow methyl bis(ethoxy) ammonium methyl sulfate (15 moles EO), tallow ethyl bis(ethoxy) ammonium methyl sulfate (15 moles EO), hydrogenated tallow methyl bis (ethoxy) ammonium chloride (15 moles EO), coco methyl bis (ethoxy) ammonium chloride (20 moles EO), and the like. Mixtures of these compounds can also be used in the context of the present invention. Additionally, in the above description, the amount of ethoxylation is the total ethoxylation for the molecule. One of ordinary skill in the art will recognize that these values can be varied while remaining within the spirit and scope of the present invention. Additionally, one of ordinary skill in the art will recognize that the values m and n can be varied, but their combined total has a profound affect on HLB. The ammonium compounds of the present invention preferably have an HLB of from 14.00 to 22.00 and are hydrophilic. A particularly preferred cationic surfactant component is cocomethyl bis[ethoxylated] (15)-quaternary ammonium chloride available from Akzo Nobel Chemicals, Inc. under the trademark Ethoquad®C/25.

A solvent, or mixtures of solvents may optionally be employed with the composition of the present invention. If a solvent is employed, it is preferably selected from the group which includes, but is not limited to water, lower alcohols such as methanol, ethanol, 1-propanol, 2-propanol and the like, glycols such as ethylene glycol, propylene glycol, diethylene glycol, dipropylene glycol, polyethylene glycol, polypropylene glycol, polyethylene glycol-polyethylene glycol block copolymers, and the like, and glycol ethers such as 2-methoxyethanol, diethylene glycol monomethylether, and the like.

The composition of the present invention may also contain various optional ingredients such as corrosion inhibitors, scale inhibitors, biocides, and the like.

The ratio of said at least one nonionic surfactant to said at least one cationic surfactant is generally in the range of 4:1 to 1:4, more preferably, 3:1 to 1:3 by weight.

In one embodiment, the present invention relates to a method for improving the permeability of an oil-containing formation which comprises treating said formation with a composition which comprises 20–80% of an ethoxylated alcohol, 10–60% of quaternary ammonium compound and optionally, up to 30% of an alkyl glycoside, and optionally a solvent.

In another embodiment, the present invention contemplates a method for improving the permeability of an oil-containing formation which comprises treating said formation with a composition which comprises 25–65% of an ethoxylated alcohol, 20–60% of quaternary ammonium compound and optionally, up to 30% of an alkyl glycoside, and optionally a solvent.

In still a further embodiment, the invention relates to a method of cleaning a porous formation and adjacent well bore from synthetic and oil-based contaminants which comprises said formation and well bore with a composition which comprises at least one ethoxylated linear or branched alcohol having from 8 to 18 carbon atoms reacted with 2 to 12 moles of ethylene oxide, at least one quaternary ammonium compound and optionally, at least one APG.

The invention also relates to the various compositions utilized to restore the permeability of oil-containing formations and to clean well bore of injection wells.

An effective concentration of the surfactant composition of the present invention in the injected solution will vary between about 0.1% to 10% by weight of the aqueous fluid and surfactant composition, preferably between about 0.1% and 5% by weight. The amount of injected solution necessary to sweep the plugging materials from the area of he formation near the well bore can readily be determined by those of ordinary skill in the art. Typically, however, the volume of injected solution will normally be less than 1 percent of the oil-containing reservoir pore space volume between the injection well and the production wells.

In treating a well in accordance with the present invention, sufficient solution should be used to fill the well bore and to fill the porous formation with a solution to a distance of about one foot to about twenty feet or more from the formation face. Typically, treating a porous formation from a distance of from about one to about four feet is sufficient to obtain good results. Once the well is injected with the composition of the present invention, the well is allowed to stand for about 2 hours up to about 96 hours or more. Typically, 10 to about 36 hours is enough time to allow the composition of the present invention to diffuse into the pores of the formation and remove the plugging materials. The well can then be either backflowed to remove the composition of the invention and displaced plugging material or injection fluid can be used to dislodge and/or displace the plugging materials.

Alternatively, the well can be treated in a continuous flow method by circulating the composition of the present invention down the tubing of the well bore and out the annulus for a period of time sufficient for the treating composition to diffuse into the formation to react with and displace the plugging materials. The treating flow is typically circulated for about 2 hours up to about 96 hours or more, preferably from about 10 to about 36 hours. This is typically enough time to allow the composition of the present invention to diffuse into the pores of the formation and remove the plugging materials although one of ordinary skill in the art will recognize that this time can vary greatly depending on the formation and the variety of plugging materials. As previously mentioned, the well is then either backflowed to remove the composition of the invention and displaced plugging material or injection fluid can be used to dislodge and/or displace the plugging materials.

After treatment, injection can be resumed and petroleum and aqueous fluids are recovered at the production well.

To utilize the composition of the present invention for the treatment of the well bores of injection wells, the composition can be intermittently or continuously circulated in the well bore to dissolve and disperse unwanted accumulations and to treat the surfaces to prevent future accumulations. A well bore cleaning effective amount of the composition of the present invention to be used in the well bore varies depending on the amount of debris to be removed, the amount of parrafins, etc. in the crude, the production rate, the temperature of the well bore, and other factors which are readily apparent to those of ordinary skill in the art.

For continuous treatment of well bores, the composition of the present invention can be circulated in the formation at an approximate rate of 50 to 500 parts per million based on oil production. Circulation of the composition can be achieved by pumping it through the casing exterior of the production pipe.

For batch treatment, the composition of the invention can be added at a rate of 1–5 gallons every 5–10 days. The circulation can occur either during injection or while production is stopped.

Other methods for improving the permeability of underground formations and treating well bores with the compositions of the present invention are within the knowledge of one of ordinary skill in the art.

We claim:

1. A method for improving the water injectivity of an injection well in a petroleum containing formation by restoring the permeability of said petroleum-containing formation thereby enhancing the recovery of oil by the waterflood process, said method comprising treating said formation with a composition which comprises at least one nonionic surfactant and at least one cationic surfactant in an amount and a concentration effective to improve the permeability of said formation, wherein said at least one nonionic surfactant is selected from the group consisting of alkanolamides, alkoxylated alcohols, alkoxylated amines, alkyl phenyl polyethoxylates, lecithin, hydroxylated lecithin, fatty acid esters, glycerol esters and their ethoxylates, glycol esters and their ethoxylates, esters of propylene glycol, sorbitan, ethoxylated sorbitan polyglycosides and mixtures thereof, and said at least one cationic surfactant is an ethoxylated quaternary ammonium compound.

2. The method of claim 1 wherein said at least one nonionic surfactant is an ethoxylated linear or branched alcohol of the formula:

$$R-O-(CH_2CH_2O)_z-H \quad (I)$$

wherein R Is a $C_8$–$C_{30}$ saturated or unsaturated, branched or straight chain alkyl, or alkylphenyl group of the formula

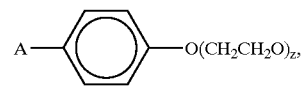

wherein A is a $C_8$–$C_{30}$ saturated or unsaturated, branched or straight chain alkyl, preferably a $C_9$–$C_{12}$ linear or branched alkyl, and z is an integer of from 1 to 30.

3. The method of claim 2 wherein A is a saturated or unsaturated, branched or straight chain $C_9$–$C_{12}$ alkyl.

4. The method of claim 2 wherein said ethoxylated alcohol is selected from the group consisting of laury alcohol ethoxylated with 3 moles of ethylene oxide(EO), coco alcohol ethoxylated with 3 moles of EO, stearyl alcohol ethoxylated with 5 moles of EO, mixed $C_{12}$–$C_{15}$ alcohol ethoxylated with 7 moles EO, mixed secondary $C_{11}$–$C_{15}$ alcohol ethoxylated with 7 moles EO, mixed $C_9$–$C_{11}$ linear alcohol ethoxylated with 6 moles EO, a $C_9$–$C_{11}$ alcohol ethoxylated with 4 moles EO, and mixtures thereof.

5. The method of claim 1 wherein said at least one cationic surfactant is an ethoxylated quaternary ammonium compound of the general formula:

(II)

wherein $R_1$ is an saturated or unsaturated, branched or straight chain alkyl group having 8–22 carbon atoms; $R_2$ is a $C_1$ to $C_6$ alkyl group, 2-ethylhexyl, hydroxyethyl, hydroxypropyl; $R_3$ is a group of the formula:

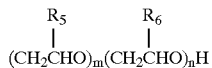

wherein $R_5$ and $R_6$ independently selected from hydrogen or a $C_1$ to $C_6$ alkyl group, and m+n is an integer of from 2–80; $R_4$ is selected from $R_2$ or $R_3$; and $X^-$ is an anion.

6. The method of claim 1 wherein said composition comprises a combination of
(i) at least one ethoxylated linear or branched alcohol having from 8 to 18 carbon atoms reacted with 2 to 12 moles of ethylene oxide;
(ii) at least one quaternary ammonium compound of the general formula:

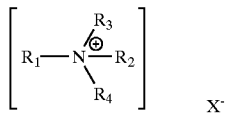
(II)

wherein $R_1$ is an saturated or unsaturated, branched or straight chain alkyl group having 8–22 carbon atoms; $R_2$ is a $C_1$ to $C_6$ alkyl group, 2-ethylhexyl, hydroxyethyl, hydroxypropyl; $R_3$ is a group of the formula:

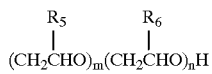

wherein $R_5$ and $R_6$ independently selected from hydrogen or a $C_1$ to $C_6$ alkyl group, and m+n is an integer of from 2–80; $R_4$ is selected from $R_2$ or $R_3$; and $X^-$ is an anion, and
(iii) up to 30% by weight of at least one (poly) alkyl glucoside.

7. The method of claim 6 wherein said ethoxylated alcohol is selected from the group consisting of lauryl alcohol ethoxylated with 3 moles of ethylene oxide(EO), coco alcohol ethoxylated with 3 moles of EO, stearyl alcohol ethoxylated with 5 moles of EO, mixed $C_{12}$–$C_{15}$ alcohol ethoxylated with 7 moles EO, mixed secondary $C_{11}$–$C_{15}$ alcohol ethoxylated with 7 moles EO, mixed $C_9$–$C_{11}$ linear alcohol ethoxylated with 6 moles EO, a $C_9$–$C_{11}$ alcohol ethoxylated with 4 moles EO, and mixtures thereof.

8. The method of claim 6 wherein $R_1$ is Coco alkyl, m+n=15, $R_2$ is methyl, $R_5$ and $R_6$ are both H and $X^-$ is $Cl^-$ or methylsulfate.

9. The method of claim 6 wherein said quaternary ammonium compound is selected from the group consisting of stearyl methyl bis(ethoxy) ammonium chloride (12 moles EO), stearyl ethyl bis(ethoxy) ammonium ethyl sulfate (15 moles EO), tallow methyl bis(ethoxy) ammonium methyl sulfate (15 moles EO), tallow ethyl bis(ethoxy) ammonium methyl sulfate (15 moles EO), hydrogenated tallow methyl bis(ethoxy) ammonium chloride (15 moles EO), coco methyl bis (ethoxy) ammonium chloride (20 moles EO), and mixtures thereof.

10. The method of claim 6 wherein the HLB of the quaternary ammonium compound is from about 14.00 to 22.00.

11. The method of claim 6 wherein said composition additionally comprises up to 30% of a (poly) alkyl glycoside of formulae III or IV:

$$R_4(CH_2)_y—O—G_xH \quad \text{(III)}$$

wherein $R_4$ is a straight or branched chain alkyl or alkenyl group having from 8 to 21 carbon atoms, G is a monosaccharide residue and x and y are selected from a number of from 1 to 5;

(iv)

wherein $R_4$ is a straight or branched chain alkyl or alkenyl group having from 8 to 21 carbon atoms, $R_5$ is hydrogen or a straight or branched chain alkyl or alkenyl group having from 8 to 21 carbon atoms, G is a monosaccharide residue and x and y are selected from a number of from 1 to 5.

12. The method of claim 1 wherein said composition additionally comprises one or more solvents.

13. The method of claim 12 wherein said solvent is selected from the group consisting of water, lower alcohols, glycol ethers and mixtures thereof.

14. The method of claim 13 wherein said solvent is selected from the group consisting of methanol, ethanol, 1-propanol, 2-propanol and the like, glycols such as ethylene glycol, propylene glycol, diethylene glycol, dipropylene glycol, polyethylene glycol, polypropylene glycol, polyethylene glycol-polyethylene glycol block copolymers, and mixtures thereof.

15. The method of claim 1 wherein the ratio of said at least one nonionic surfactant to said at least one cationic surfactant is in the range of 4:1 to 1:4.

16. The method of claim 15 wherein said composition comprising said at least one nonionic surfactant to said at least one cationic surfactant is diluted to a concentration of from about 0.1% to about 10% by weight prior to injection into the formation.

* * * * *